United States Patent [19]
Hur

[11] Patent Number: 6,055,109
[45] Date of Patent: Apr. 25, 2000

[54] HEAD-MOUNTED DISPLAY APPARATUS WITH A SINGLE IMAGE DISPLAY DEVICE

[75] Inventor: Se-Hurn Hur, Seoul, Rep. of Korea

[73] Assignee: Daewoo Electronics Co., Ltd., Rep. of Korea

[21] Appl. No.: 09/203,560

[22] Filed: Dec. 2, 1998

[51] Int. Cl.⁷ .................................................. G02B 27/14
[52] U.S. Cl. ........................................ 359/630; 359/631
[58] Field of Search .................................. 359/618, 629, 359/630, 632, 633, 636, 631; 345/7–9

[56] References Cited

U.S. PATENT DOCUMENTS

| | | | |
|---|---|---|---|
| 5,751,493 | 5/1998 | Hur | 359/630 |
| 5,808,802 | 9/1998 | Hur | 359/630 |
| 5,912,650 | 6/1999 | Carollo | 345/7 |

FOREIGN PATENT DOCUMENTS

| | | |
|---|---|---|
| 0908319 | 10/1962 | United Kingdom . |
| 2317022 | 3/1998 | United Kingdom . |
| 2319423 | 5/1998 | United Kingdom . |
| 9504435 | 2/1995 | WIPO . |

OTHER PUBLICATIONS

British Patent Office Search Report Nov. 14,1994.

*Primary Examiner*—Georgia Epps
*Assistant Examiner*—Suzanne Letendre
*Attorney, Agent, or Firm*—Pennie & Edmonds LLP

[57] ABSTRACT

A head-mounted display apparatus includes an image display device for displaying images, a first flat reflection mirror for reflecting light from the image display device, a first and a second lenses for controlling a size of the image from the first flat reflection mirror, a first beam splitter for partially transmitting and partially reflecting the light passing through the first and the second lenses, thereby splitting two light beams, a second flat reflection mirror for reflecting the transmitted light beam, a second beam splitter for partially transmitting and partially reflecting the light beam from the second flat reflection mirror, a first reflection mirror for reflecting the light beam reflected by the second beam splitter to one eye of a viewer, a third flat reflection mirror for reflecting the light beam reflected by the first beam splitter, a fourth flat reflection mirror for reflecting the light beam from the third flat reflection mirror, a third beam splitter for partially transmitting and partially reflecting the light beam from the fourth flat reflection mirror and a second reflection mirror for reflecting the light beam reflected by the third beam splitter to the other eye of the viewer.

6 Claims, 2 Drawing Sheets

HEAD-MOUNTED DISPLAY APPARATUS WITH A SINGLE IMAGE DISPLAY DEVICE

FIELD OF THE INVENTION

The present invention relates to a head-mounted display apparatus; and, more particularly, to a head-mounted display apparatus incorporating therein a single image display device.

DESCRIPTION OF THE PRIOR ART

There is shown in FIG. 1 a schematic diagram of a conventional head-mounted display apparatus comprising a pair of image display devices 1, 2, e.g., liquid crystal displays, and a pair of magnifying lenses 3, 4.

The image display devices 1, 2, disposed in front of left and right eyes 5, 6 of a viewer, respectively, are connected to a video signal source (not shown) and display images on the basis of video signals therefrom.

The magnifying lenses 3, 4 are positioned between the image display devices 1, 2 and the left and the right eyes 5, 6, respectively, thereby enabling the viewer to see enlarged virtual images formed at a certain distance from the eyes 5, 6.

However, as a result of the presence of two image display devices, such a conventional head-mounted display apparatus is fairly heavy, making it burdensome on the viewer's head. In addition, there exists a complicated circuit for transmitting the video signals to the individual image display device.

SUMMARY OF THE INVENTION

It is, therefore, a primary object of the invention to provide a head-mounted display apparatus having a reduced weight and a simplified circuit by incorporating therein a single image display device.

In accordance with an aspect of the present invention, there is provided a head-mounted display apparatus comprising: an image display device for displaying images; a first flat reflection mirror for reflecting light from the image display device; a first and a second lenses for controlling a size of the image from the first flat reflection mirror; a first beam splitter for partially transmitting and partially reflecting the light passing through the first and the second lenses, thereby splitting two light beams; a second flat reflection mirror for reflecting the transmitted light beam; a second beam splitter for partially transmitting and partially reflecting the light beam from the second flat reflection mirror; a first reflection mirror for reflecting the light beam reflected by the second beam splitter to one eye of a viewer; a third flat reflection mirror for reflecting the light beam reflected by the first beam splitter; a fourth flat reflection mirror for reflecting the light beam from the third flat reflection mirror; a third beam splitter for partially transmitting and partially reflecting the light beam from the fourth flat reflection mirror; and a second reflection mirror for reflecting the light beam reflected by the third beam splitter to the other eye of the viewer.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENT

Figure 1:
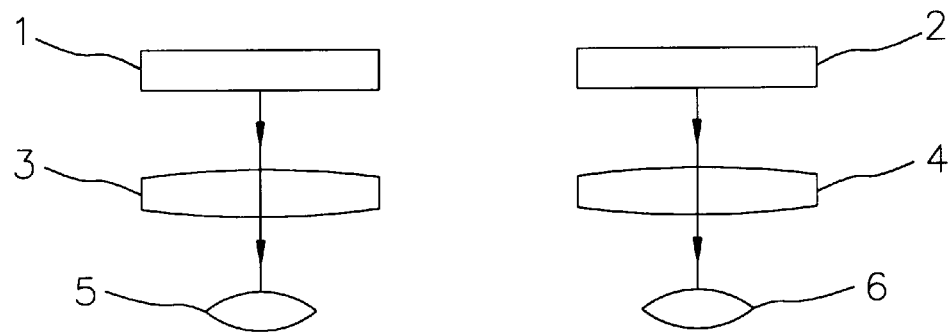
FIG. 1 shows a schematic diagram of a conventional head-mounted display apparatus.
Figure 2:
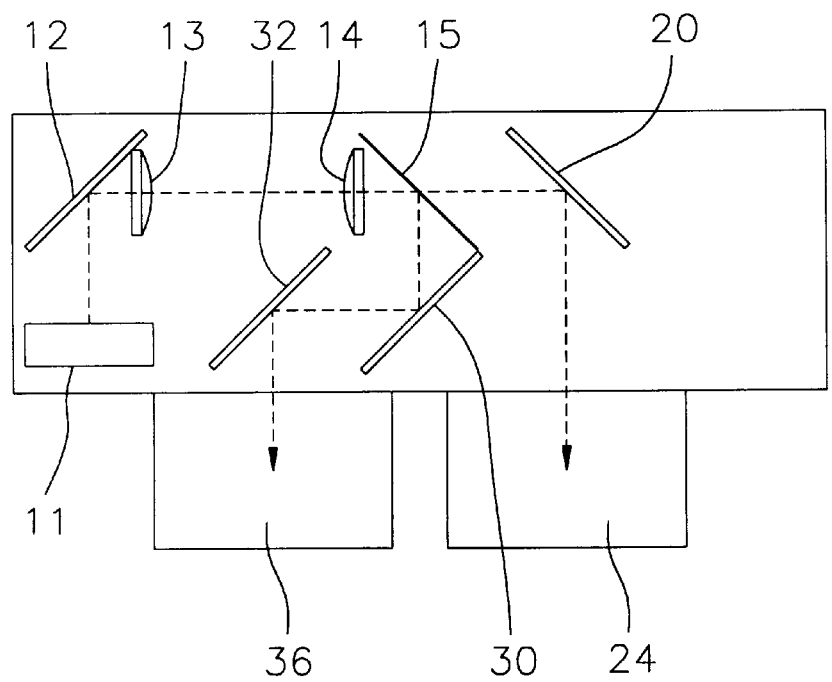
FIGS. 2 and 3 illustrate a schematic diagram and a schematic perspective view setting forth an light path and an arrangement of optical elements of a head-mounted display apparatus in accordance with the present invention, respectively.
Figure 3:
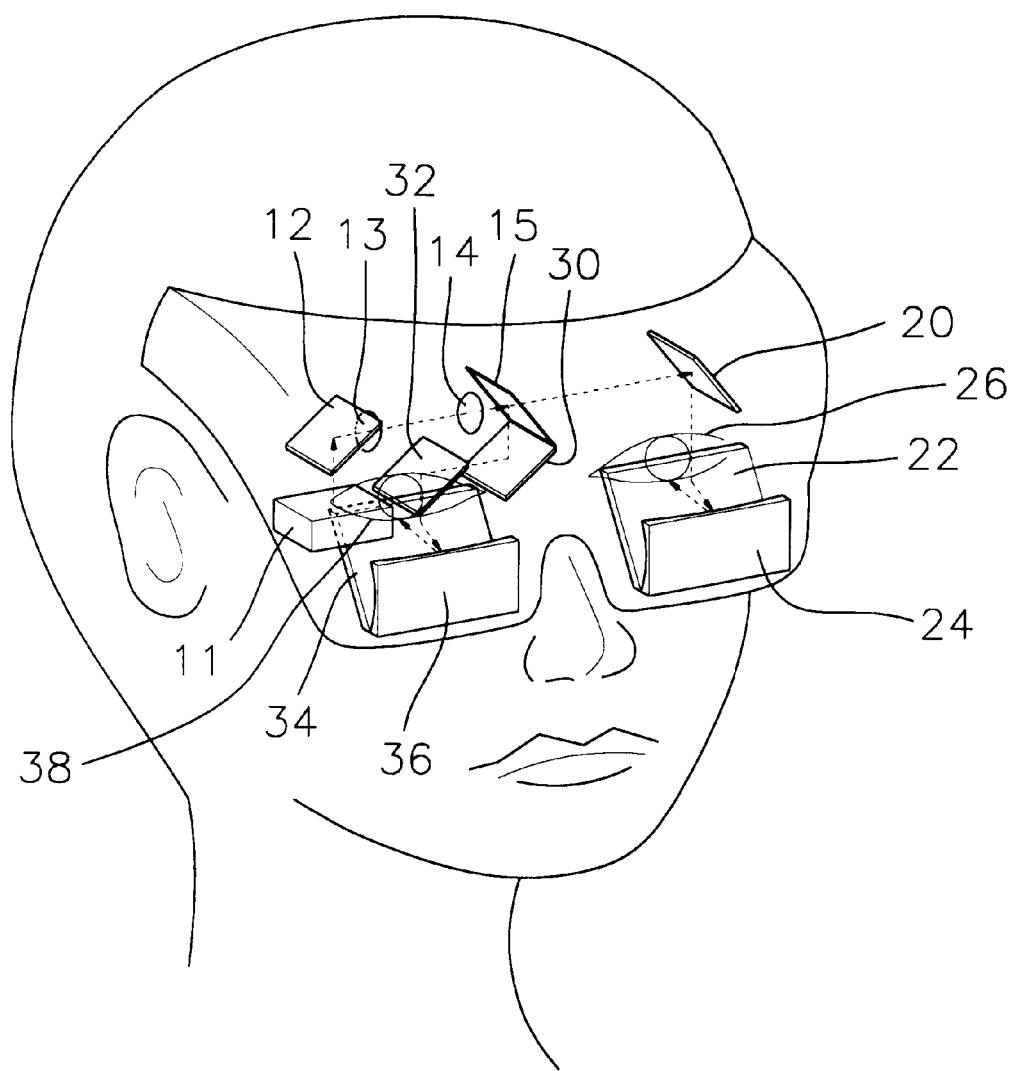

Referring to FIGS. 2 and 3, the head-mounted display apparatus in accordance with the present invention includes an image display device 11, e.g., a liquid crystal display or cathode ray tube, a first flat reflection mirror 12, a first and a second convex lenses 13, 14 for controlling a size of the images, a first beam splitter 15, e.g., a half mirror, for partially transmitting and partially reflecting light from the image display device 11. The inventive head-mounted display apparatus further includes, along the path of the transmitted light beam, a second flat reflection mirror 20, a second beam splitter 22 (see FIG. 3), e.g., a half mirror, and a first concave reflection mirror 24; and along the path of the light beam reflected by the first beam splitter 15, a third and a fourth flat reflection mirrors 30, 32, a third beam splitter 34 (see FIG. 3), e.g., a half mirror, and a second concave reflection mirror 36.

The image display device 11 is connected to a video signal source (not shown) such as a personal computer, a video cassette recorder, a laser disc player etc., and displays images on the basis of video signals therefrom.

The first flat reflection mirror 12, disposed above the image display device 11 in such a manner that the reflection surface of the first flat reflection mirror 12 has an inclination of 45° with respect to the image display device 11, totally reflects the light from the image display device 11 to the first and the second convex lenses 13, 14.

The first and the second convex lenses 13, 14, placed between the first flat reflection mirror 12 and the first beam splitter 15, controls the size of the image from the first flat reflection mirror 12 and leads it to the first beam splitter 15.

The first beam splitter 15, positioned on the same level of the first flat reflection mirror 12 so as to make it symmetric with respect to the first flat reflection mirror 12, partially transmits and partially reflects the light passing through the first and the second convex lenses 13, 14, thereby splitting it into two light beams. The transmitted light beam travels to the second flat reflection mirror 20 and the reflected light beam travels to the third flat reflection mirror 30.

The second flat reflection mirror 20, arranged on the same level of the first beam splitter 15, totally reflects the transmitted light beam to the second beam splitter 22.

The second beam splitter 22, placed under the second flat reflection mirror 20 and between the first concave reflection mirror 24 and a left eye 26 of a viewer, partially transmits and partially reflects the light beam from the second flat reflection mirror 20.

The first concave reflection mirror 24, disposed on the reflection side of the second beam splitter 22 with the second beam splitter 22 being positioned between the left eye 26 of the viewer and it, totally reflects the light beam reflected by the second beam splitter 22 to the second beam splitter 22 again. Thereafter, the light beam reflected by the first concave reflection mirror 24 is incident to the left eye 26 of the viewer via the second beam splitter 22.

On the other hand, the third flat reflection mirror 30, placed under the first beam splitter 15, totally reflects the light beam reflected by the first beam splitter 15 to the fourth flat reflection mirror 32.

The fourth flat reflection mirror 32, disposed on the same level of the third flat reflection mirror 30, totally reflects the light beam from the third flat reflection mirror 30 to the third beam splitter 34.

The third beam splitter 34, arranged under the fourth flat reflection mirror 32 and between the second concave reflection mirror 36 and a right eye 38 of the viewer, partially transmits and partially reflects the light beam from the fourth flat reflection mirror 32.

The second concave reflection mirror 36, disposed on the reflection side of the third beam splitter 34 with the third beam splitter 34 being positioned between the right eye 38 of the viewer and it, totally reflects the light beam reflected by the third beam splitter 34 to the third beam splitter 34 again. Thereafter, the light beam reflected by the second concave reflection mirror 36 is incident to the right eye 38 of the viewer via the third beam splitter 34.

In such a head-mounted display apparatus of the present invention, since only one image display device is required, the production cost thereof is reduced and the weight thereof is decreased. In addition, the circuit for transmitting the video signals to the image display device is much more simpler.

Although the invention has been shown and described with respect to the preferred embodiments, it will be understood by those skilled in the art that various changes and modifications may be made without departing from the spirit and scope of the invention as defined in the following claims.

What is claimed is:

1. A head-mounted display apparatus comprising
   an image display device for displaying images;
   a first flat reflection mirror for reflecting light from the image display device;
   a first and a second lenses for controlling a size of the image from the first flat reflection mirror;
   a first beam splitter for partially transmitting and partially reflecting the light passing through the first and the second lenses, thereby splitting two light beams;
   a second flat reflection mirror for reflecting the transmitted light beam;
   a second beam splitter for partially transmitting and partially reflecting the light beam from the second flat reflection mirror;
   a first reflection mirror for reflecting the light beam reflected by the second beam splitter to one eye of a viewer;
   a third flat reflection mirror for reflecting the light beam reflected by the first beam splitter;
   a fourth flat reflection mirror for reflecting the light beam from the third flat reflection mirror;
   a third beam splitter for partially transmitting and partially reflecting the light beam from the fourth flat reflection mirror; and
   a second reflection mirror for reflecting the light beam reflected by the third beam splitter to the other eye of the viewer.

2. The apparatus of claim 1, wherein the first to the fourth flat reflection mirrors reflect the light totally.

3. The apparatus of claim 1, wherein the first and the second reflection mirrors are concave reflection mirrors.

4. The apparatus of claim 1, wherein the first and the second lenses are convex lenses.

5. The apparatus of claim 1, wherein the beam splitters are half mirrors.

6. The apparatus of claim 1, wherein the first flat reflection mirror is disposed above the image display device in such a manner that the reflection surface of the first flat reflection mirror has an inclination of 45° with respect to the image display device, the first and the second lenses are placed between the first flat reflection mirror and the first beam splitter, the first beam splitter is positioned on the same level of the first flat reflection mirror so as to make it symmetric with respect to the first flat reflection mirror, the second flat reflection mirror is arranged on the same level of the first beam splitter, the second beam splitter is placed under the second flat reflection mirror and between the first reflection mirror and one eye of the viewer, the first reflection mirror is disposed on the reflection side of the second beam splitter with the second beam splitter being positioned between one eye of the viewer and it, the third flat reflection mirror is placed under the first beam splitter, the fourth flat reflection mirror is disposed on the same level of the third flat reflection mirror, the third beam splitter is arranged under the fourth flat reflection mirror and between the second reflection mirror and the other eye of the viewer, and the second reflection mirror is disposed on the reflection side of the third beam splitter with the third beam splitter being positioned between the other eye of the viewer and it.

* * * * *